United States Patent [19]

Shibata et al.

[11] Patent Number: 5,298,475
[45] Date of Patent: Mar. 29, 1994

[54] CARBON DIOXIDE ABSORBER AND METHOD FOR MANUFACTURING SAME FROM BUILDING INDUSTRIAL WASTE

[75] Inventors: Hitoshi Shibata; Young-II Im; Kang-Haeng Lim, all of Shiga, Japan

[73] Assignee: Kyoei Bussan Kabushiki Kaisha, Japan

[21] Appl. No.: 6,508

[22] Filed: Jan. 21, 1993

[30] Foreign Application Priority Data

Feb. 7, 1992 [JP] Japan .................................. 4-056051

[51] Int. Cl.$^5$ ........................ B01J 20/04; B01J 38/72; C01B 31/20
[52] U.S. Cl. .................................... 502/400; 95/139; 423/230; 502/21; 502/407
[58] Field of Search ................ 502/400, 407, 411, 21; 423/225, 230, 244.07; 95/139

[56] References Cited

U.S. PATENT DOCUMENTS 4,492,649 1/1985 Cheh et al. ..................... 423/230 X

FOREIGN PATENT DOCUMENTS 0142903 5/1985 European Pat. Off. .
3611769 10/1987 Fed. Rep. of Germany .
3708850 7/1988 Fed. Rep. of Germany .

OTHER PUBLICATIONS

*Patent Abstracts of Japan*, vol. 15, No. 231 (C-840), "Method and Treatment of Exhaust Gas and Preparation of Silica Gel Utilizing the Same" Jun. 12, 1991.
*Patent Abstracts of Japan*, vol. 3, No. 118 (C-60), "Removing Method for Harmful Gas Contained in City Refuse Incinerator Waste Gas." Oct. 4, 1979.

*Primary Examiner*—Paul E. Konopka
*Attorney, Agent, or Firm*—Ostrolenk, Faber, Gerb & Soffen

[57] ABSTRACT

A carbon dioxide consuming material and a method for manufacturing it from waste released in the building industry, including: a primary crushing step 5 for crushing concrete fragments 1 under a pressure; a secondary crushing step 7 for crushing or smashing primary-crushed concrete fragments 11 from the primary crushing step by utilizing a grinding motion in a highly dense and pressurized condition; and a screening and separating step 8 for mixture of products obtained by the secondary crushing step.

7 Claims, 1 Drawing Sheet

CARBON DIOXIDE ABSORBER AND METHOD FOR MANUFACTURING SAME FROM BUILDING INDUSTRIAL WASTE

BACKGROUND OF THE INVENTION

1. Field of the Invention

This invention relates to reusing building industrial waste and, in particular, to a carbon dioxide absorber in the form of fine powder of mortar, which is made by crushing fragments of concrete, and to a method for manufacturing the carbon dioxide absorber from concrete fragments released as building industrial waste.

2. Description of the Prior Art

Heretofore, concrete fragments, which are most part of building industrial waste, have been crushed into lumps in the order of 50 mm and are used as a roadbed material or a backfilling material. These ways of use, however, consume only a limited amount of waste, and unused waste, which is inevitably disposed as useless matter, causes a serious problem in terms of industrial waste disposal.

Concrete fragments include aggregate, such as ballast, crushed stone, and so on, and unreacted cement. The existing ways of reusing such waste have been directed only to the use as a roadbed material or a backfilling material, without paying attention to resources contained in concrete fragments, and no consideration has been taken on effective use of the resources.

Under these circumstances, the present Applicant filed a patent application for an invention entitled "Method for Reproducing Aggregate from Building Industrial Waste" in the Japanese Patent Office on Dec. 25, 1991, which proposes to obtain high-quality reproduced aggregate from building industrial waste.

The prior proposal certainly makes it possible to reproduce high-quality aggregate from concrete fragments released as building industrial waste. However, as to processing of mortar released as by-products in the form of fine grains, the prior application merely proposes to use it as a soil modifier by mixing it with reproduced minute aggregate obtained simultaneously and by using unreacted cement component.

It is noted that, along with industrial development and an increase in energy consumption, a progressively large amount of oxygen has been consumed and that carbon dioxide generated thereby continues to break the balance in the global environment and causes global warming.

Although generation of carbon dioxide has been treated as a serious issue, there are still only a few proposals on positive consumption or absorption of carbon dioxide, and the present status is far from solution of the issue.

OBJECT OF THE INVENTION

It is therefore an object of the invention to provide a way of preventing an increase in carbon dioxide by reproducing ballast, crushed stone, and other resources from concrete fragments released as building industrial waste to solve the problem of disposal of building industrial waste, and by effectively using the resources contained in the building industrial waste as a carbon dioxide absorber.

SUMMARY OF THE INVENTION

The present invention utilizes the phenomenon that concrete is neutralized by carbon dioxide in air, and it is directed to a carbon dioxide absorber in the form of fine powder of mortar which is released when coarse aggregate, such as ballast, crushed stone, and so on, is reproduced by crushing concrete fragments released as building industrial waste, and to a method for manufacturing the carbon dioxide absorber.

It is known that concrete gradually loses alkali content because calcium hydroxide ($Ca(OH)_2$) in concrete gradually changes to calcium carbonate ($CaCO_3$) due to reaction by carbon dioxide ($CO_2$) in air. Neutralization of concrete by loss of its alkali content is considered to be an undesired phenomenon that causes corrosion of reinforcement in the concrete by loss of its alkali content is considered to be an undesired phenomenon that causes corrosion of reinforcement in the concrete by air or water entering therein and decreases the bearing force and durability of the building.

The invention utilizes the phenomenon of neutralization of concrete by carbon dioxide gas in air, and uses fine powder of mortar, which is reproduced by crushing concrete fragments released as building industrial waste, as a carbon dioxide absorber.

The invention further provides a method for manufacturing the carbon dioxide absorber by screening and separating fine powder of mortar by crushing concrete fragments released as building industrial waste.

Aggregate in concrete released as building industrial waste has a compressive strength of about 1 ton/$cm^2$ or more while cement paste (mortar component) contained in concrete fragments has a maximum compressive strength of only 500 kg/$cm^2$ or less.

The present invention provides a method for obtaining fine powder of mortar by separating cement paste component from aggregate such as ballast, crushed stone, and so on, by utilizing differences among compressive strengths of respective elements in concrete. That is, the invention separates mortar component adherent on surfaces of respective pieces of ballast or crushed stone to obtain fine powder of mortar by employing a method similar to that which threshes and separates kernels into unpolished rice and chaff and then polishes the unpolished rice to separate it into polished rice and rice bran.

The separating method used in the invention includes: crushing concrete fragments into lumps of a grain size on the order of 50 mm by a primary crusher, and supplying them to a secondary crusher which separates mortar component from aggregate and grinds it into fine powder by a long-time grinding motion in a highly dense and pressurized condition.

The secondary crusher may be a disc crusher in which material grains are poured into a portion between a fixed upper liner and a rotating lower liner and are ground into manufactured sand by rotation of the lower liner.

DETAILED DESCRIPTION OF THE PREFERRED EMBODIMENTS

Figure 1:
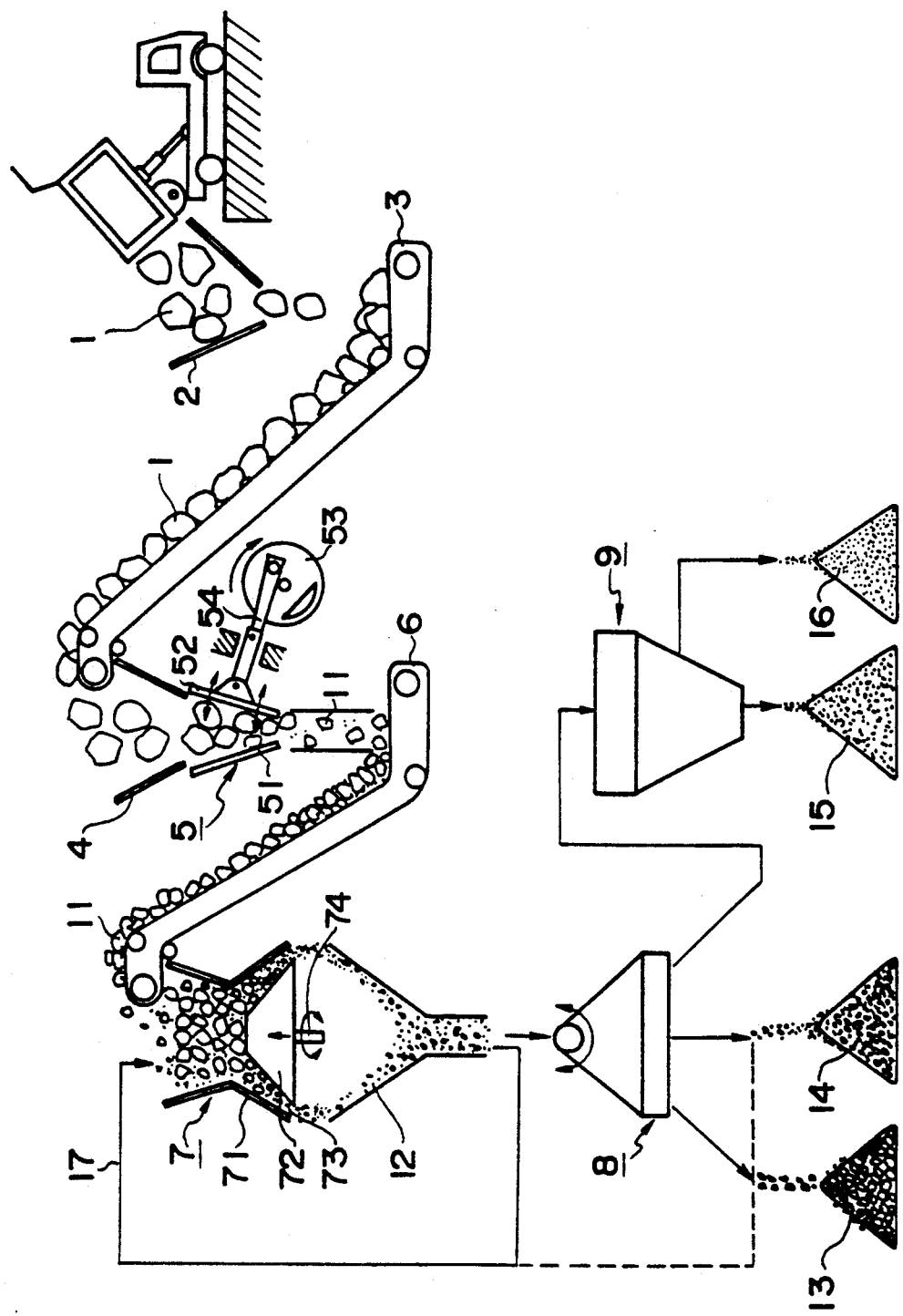
FIG. 1 schematically shows a process for manufacturing a carbon dioxide absorber from building industrial waste according to the invention.

A carbon dioxide absorber and its manufacturing method embodying the invention are explained below with reference to the attached drawing.

Raw material used in the manufacturing method according to the invention is concrete fragments released from building sites.

Concrete fragments 1 are poured to a hopper 2, then transported by a belt conveyor 3 to an upper portion of a primary crusher 5, and delivered to a hopper 4 of the primary crusher.

The primary crusher 5 includes a fixed member 51 and a movable member 52. The movable member 52 is coupled to a rotary member 53 by a link mechanism 54 and can move to and away from the fixed member 51. The movable member 52 may be, for example, a compressive crusher which is called a jaw crusher.

Concrete fragments 11 after primary crushing by the primary crusher 5 have a grain size of 50 mm or less.

The primary-treated concrete fragments 11 are transported by a belt conveyor 6 to an upper portion and supplied to a secondary crusher 7 for secondary crushing which separates mortar component from aggregate.

The amount of raw material in the crusher 7 can be monitored by using a level instrument, or the like, to ensure stable secondary crushing by choke feed driving which controls the amount of raw material supplied to the crusher and the amount of products discharged from the crusher to be equal so that a constant amount of raw material resides in the crusher.

The secondary crusher 7 includes a fixed upper liner 71 and a lower liner 72 rotated by a rotary shaft 74. Area between the upper liner 71 and the lower liner 72 progressively decreases as it approaches an outlet 73. The secondary crusher 7 may be, for example, a disc crusher for producing crushed sand of a constant grain size by rotation of the lower liner.

The width of the outlet 73 can be adjusted to a desired size preferably in the range of 5 to 30 mm. By adjusting the width of the outlet 73, the residence time in the secondary crusher can be controlled.

Existing cone crushers have a rotary shaft biased upward with a strength of 30 kg/cm$^2$, approximately. In contrast, the rotary shaft of the crusher according to the invention is biased upward with a strength as large as 120 to 130 kg/cm$^2$, approximately. The larger the pressure is applied, the larger the amount of mortar component that could be separated from aggregate.

Grains in the primary-crushed concrete fragments 11 delivered to the secondary crusher 7 get in friction contact with each other in the secondary crusher, and the mortar component adherent on aggregate and having a relatively small compressive strength drops from the aggregate due to mutual friction among the grains. As a result, aggregate and mortar component are separated and discharged as reproduced products through the outlet 73.

In order to ensure sufficient separation in the secondary crusher, it is necessary for concrete fragments to reside in the crusher for a long time. In the case where raw material is supplied to a normal cone crusher, it takes only one to three seconds for the raw material to pass the crusher. With the secondary crusher 7, however, having a dam near the outlet 73, the passing time is increased to 3 to 10 seconds, and the residence time of raw material is greater. That is, by providing the dam near the outlet, the angle of the outlet can be made sufficiently smaller than the angle of repose of raw material (The maximum slope at which a heap of the raw material will come to rest when poured in a pile. At a greater slope, grains will slide down.). Therefore, the outlet prevents raw material from readily slipping or sliding down through the crusher without receiving sufficient treatment, and hence contributes to an increase in the residence time.

It is also possible to use a plurality of crushers as the secondary crusher 7 in the form of a multi-stage crushing arrangement for increasing the amount of mortar component separated from aggregate. In this case, respective crushers may be driven in different appropriate driving conditions in accordance with sizes or other terms of grains supplied. Then high-quality products can be obtained by preventing the aggregate itself from being crushed to a size smaller than that desired and by separating a greater amount of mortar component.

Part of reprocessed products 12 may be fed back to the secondary crusher 7 for use as an abrasive material. By adding the abrasive material, a greater amount of mortar component adherent on aggregate can be separated therefrom.

The reprocessed products 12 separated and discharged from the secondary crusher 7 include different kinds of elements, and they are separated by a screen 8 into middle-grain aggregate 13 consisting of ballast having a grain size of 15 to 20 mm, small-grain aggregate 14 consisting of ballast having a grain size of 5 to 15 mm, and minute aggregate having a grain size of 5 mm or less. The minute aggregate is further separated by an air separator 9 into minute aggregate 15 consisting of sand, or the like, having a grain size of 0.13 to 5 mm, and fine grains 16 consisting of mortar component, or the like, having a grain size of 0.13 or less.

It is generally noted that neutralization of concrete progresses in the atmosphere from its outer surface by 7 mm every hundred years. That is, if neutralization is linear from the outer surface, it progresses to the depth of 0.07 mm in a year. If fine grains of mortar obtained by crushing concrete fragments have a diameter of 0.14 mm, they react on carbon dioxide in air and will be fully neutralized to calcium carbonate in a year.

Assume that fine grains of mortar obtained by crushing concrete fragments are held in a 10 cm long, 5 cm wide, 20 cm high, 1000 cm$^3$ volumetric, air-permeable container exposed to the atmosphere. Then, if the fine grains include 60% of calcium hydroxide, have a bulk specific gravity of about 1 g/cm$^3$, and are held in an air-permeable condition, the container contains fine grains of 1 kg.

Mortar component in concrete contains 60% of calcium hydroxide (Ca(OH)$_2$) which becomes calcium carbonate (CaCO$_3$) as a result of reaction on carbon dioxide in air indicated below:

$$Ca(OH)_2 + CO_2 \rightarrow CaCO_3 + H_2O;$$

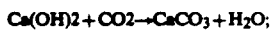

In the foregoing reaction formula, molecular weights are: 74 g/mol for calcium hydroxide, 44 g/mol for carbon dioxide, 100 g/mol for calcium carbonate, and 18 g/mol for water; then the number of molecules of 0.6 kg of calcium hydroxide contained in 1 kg of fine grains is 8.1 mol.

If the full amount of 8.1 mol of calcium hydroxide is neutralized in a year, calcium carbonate produced will be 0.81 kg, carbon dioxide consumed will be 0.36 kg, and the number of the molecules will be $4.9 \times 10^{24}$.

If the container containing fine grains of mortar is placed in the engine room of a car, carbon dioxide will reach and extent to gaps among the fine grains as the car runs, and heat in the engine room will promote the reaction. If such containers are mounted in 10 million cars in the country, 3,600 tons of carbon dioxide will be consumed a year.

In addition to the above-mentioned way of use, if such a container may be attached to a fixed-type dust collector having a large-scaled fan for constraint neutralization, it will absorb a large amount of carbon dioxide in a short time and contributes to determent of global warming. Moreover, such containers may be provided in moving bodies such as trains, vessels, planes, and so on, for further promoting the reaction.

The manufacturing method explained above as an embodiment of the invention uses a disc crusher; however, the carbon dioxide absorber according to the invention is not limited to that produced by the method described above, but it is sufficient that it is fine powder of mortar obtained from concrete fragments released as building industrial waste, either by the said method or other methods.

Since the invention uses a crushing procedure by a grinding motion for the secondary crushing treatment, the crushing and separating operation by the secondary crushing first occurs to relatively weak mortar component, and relatively strong part, such as ballast and crushed stone, remains uncrushed. Therefore, only the mortar component is entirely removed from the aggregate in the form of fine mortar grains, and reactivity of the products on carbon dioxide can be increased.

Thus, the invention provides a carbon dioxide absorber obtained from building industrial waste, and contributes to determent of global warming. In addition, since calcium carbonate, when calcined, may be used as raw material in the cement manufacturing industry, it may be stored in post-mine sites in lime mines for a time until it is calcined and reused as reproduced cement when other global warming determent techniques are developed or established and the cement manufacturing techniques are improved.

Since calcium carbonate is the same as major component of marine creatures such as coral, it may be thrown to the ocean without causing environmental pollution.

It is thus possible to effectively use concrete fragments released as building industrial waste.

We claim:

1. A method for manufacturing a carbon dioxide absorber from building industrial waste, comprising:
   a first crushing step for crushing concrete fragments under a pressure and for obtaining primary-crushed concrete fragments;
   a second crushing step for crushing said primary-crushed concrete fragments with a grinding motion in a highly dense and pressurized condition and for obtaining mixture of reproduced products; and
   screening and separating fine cement mortar component from said mixture of reproduced products.

2. The manufacturing method according to claim 1 wherein said second crushing step uses a crusher including a fixed upper liner and a rotating lower liner, said lower liner being biased upward.

3. The manufacturing method according to claim 1 wherein an abrasive is supplied in said crusher in said second crushing step.

4. The manufacturing method according to claim 1 wherein said crusher used in said second crushing step includes a discharge outlet whose width can be adjusted to control the residence time of crushed grains in said crusher.

5. The manufacturing method according to claim 1 wherein said second crushing step uses a plurality of crushers to effect multi-stage crushing treatment.

6. The manufacturing method according to claim 1 wherein the primary-crushed concrete fragments have a grain size on the order of 50 mm or less and the fine cement mortar has a grain size in the range of 5 to 30 mm.

7. The manufacturing method according to claim 1 in which the crushing strength employed is up to approximately 130 kg/cm$^2$.

* * * * *